United States Patent [19]

Mann

[11] Patent Number: 4,809,441
[45] Date of Patent: Mar. 7, 1989

[54] UNIVERSAL PRECISION SINE BAR ATTACHMENT

[75] Inventor: Franklin D. Mann, Manchester, Tenn.

[73] Assignee: The United States of America as represented by the Administrator of the National Aeronautics and Space Administration, Washington, D.C.

[21] Appl. No.: 165,943

[22] Filed: Mar. 9, 1988

[51] Int. Cl.$^4$ .......................... G01B 3/18; G01B 3/30
[52] U.S. Cl. ..................................................... 33/536
[58] Field of Search ........................... 33/536, 537, 534

[56] References Cited

U.S. PATENT DOCUMENTS 3,336,675  8/1967  Wood ................................ 33/536 X
4,651,435  3/1987  Wettstein .............................. 33/536

Primary Examiner—Harry N. Haroian
Attorney, Agent, or Firm—William J. Sheehan; John R. Manning; Charles E. B. Glenn

[57] ABSTRACT

An improved sine bar apparatus for the precise measurement of angles for machining operation. The sine bar apparatus comprises a flat, rectangular base which has an upper and a lower surface with four sides. A collet adapter extends from one side of the base at right angles thereto in a plane which is parallel to the upper surface of the base and there is at least one slot extending transversely of one side of the base. A reference bar is attached to one of the other sides of the base and has a support surface which extends above the upper surface of the base. An elongated, generally rectangular sine bar, which has a reference surface extending along one side, is pivotally connected to the base and is supported on the upper surface of the base. The sine bar is pivotally connected at a point intermediate its ends, though the transverse slot adjacent the side of which the reference bar is attached, and has one of its ends in contact with the support surface of the reference bar. The other end of the sine bar is separated from the support surface of the reference bar by means of a plurality of gauges or gauge blocks which are precisely machined to cause the reference surface of the sine bar to form a predetermined angle with the longitudinal axis of the collet adapter. The reference bar and the sine bar can be attached to either of the three sides of the base to provide a variation in the angles measured.

16 Claims, 4 Drawing Sheets

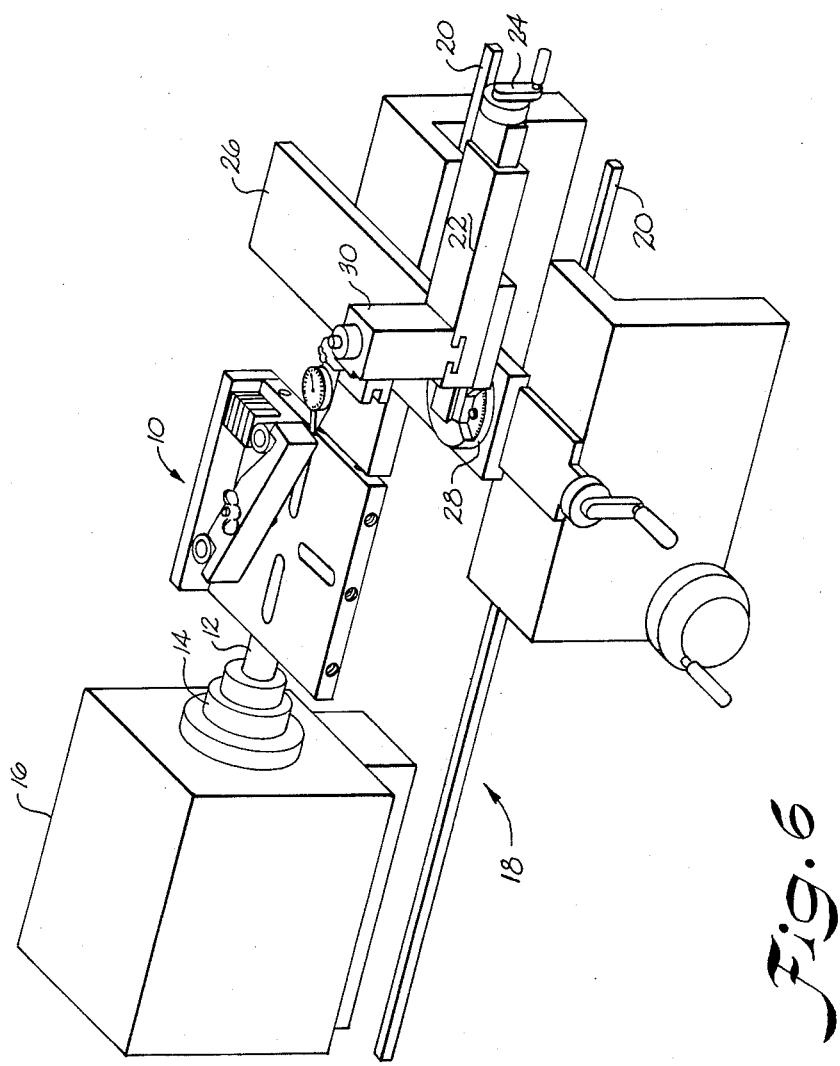

UNIVERSAL PRECISION SINE BAR ATTACHMENT

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

The present invention relates in general to devices for accurately measuring and checking angles, more particularly to sine bars and their methods o application to the machining of metal parts.

A sine bar is a device for measuring angles to a high degree of accuracy which comprises one or more bars, one of which forms a base or reference point and the other of which extends from the base at the desired angle with the sine bar itself being supported on one end by the base or reference bar and on the other end by a series of gauge blocks which are interposed between a bearing point on the other end and the base or reference surface to form a precise angle. Precisely dimensioned gauge blocks, the reference bar and the sine bar are combined to permit accurate measurement of a predetermined angle by the conventional formula: Sine $0 = a/h$, where "a" is the height of the interposed gauge blocks and "h" is the length of the hypotenuse formed by the sine bar. This principle is the basis of a prior art sine bar in wide use which comprises a single reference bar for use in conjunction with a flat base, and also of an improved device entitled, "Sine Bar for Lathe Attachment" disclosed in Russian Inventor's Certificate No. 278,353, issued to Kilin G. I. Glukhov on May 8, 1970.

The single element sine bar is commonly used in the prior art cylindrical grinders and other spindle/type machines to set a compound or a head stock accurately to a desired angle.

The problem with the improved model of the type disclosed in the Russian Inventor's Certificate to Glukhov is that the cylindrical body portion of the base member is strictly limited to cylindrical applications and cannot be used on flat surfaces, such as in milling, surface grinding, granite surface plates, and other similar applications. Furthermore, it can only be mounted on spindle type machines by using axially aligned centers at the opposite ends of the bar. This limits the device to specific orientation and thus to specific applications. The Glukhov sine bar is not designed to be mounted on the lathe by use of a collet or chuck at either end of the body which limits its versatility as it must always be mounted between center. Another approach at a compound sine bar is found in U.S. Pat. No. 4,651,435. In this patent, the sine bar comprises a rectangular, elongated base member, projecting from opposite ends of which are cylindrical connector rods. A conforming reference bar is hinged to the base member and has a cylindrical bearing pin fastened beneath one of its ends. When the sine bar is opened to accommodate one or more calibrated gauge blocks, a spring-biased chain keeps the gauge blocks in position between the base member and the bearing pin. A recess is provided in the base member, and permits measurements of small angles. This device is used for setting up a lathe compound to calibrate its angular positions and is also said to be useful for other types of milling and machining operations in which the sine bar rests on a flat surface. The sine bar in this patent is adequate for some purposes but is limited in the angles that it can be used to measure.

SUMMARY OF THE INVENTION

Accordingly, it is the object of this invention to improve the accuracy of sine bar measurements and to expedite the set-up and verification in setting up machine tools such as milling machines or lathes where a high degree of precision is required, that is, a precision that is greater than the typical machine gradations.

A more particular object of the invention is to provide an attachment for a sine bar which can be used to perform many different types of measurements during lathe operations or other types of machining operations. The attachment can be used for setting precision angles on vises, dividing heads, rotary tables, and angle plates. The attachment can also be used in the inspection of machined parts, when close tolerances have to be held, and in the layout of precision hardware.

These and other objects are obtained with the sine bar of the invention and the disclosed method of using it. The sine bar of the invention comprises a rectangular base having a collet adapter extending from one side of the base at right angles thereto. Disposed along one side of the rectangular base is a reference bar which is attached to the side and provides a support surface which is parallel with the side of the rectangular base and has its support surface extending above the surface of the base itself. The reference bar is attached to the side of the base by means of machine bolts and the like and can be attached to either of the three sides other than the side on which the collet adapter is disposed. The base of the sine bar has a plurality of slots, two of which are at right angles to the longitudinal axis of the collet adapter and the other two of which have their longitudinal axes coextensive with the longitudinal axis of the collet adapter.

A precisely machined sine bar is pivotally mounted in one of the longitudinal slots so as to hold the sine bar in place. On one end of the sine bar is a rotary pin or roller support for rolling contact with the support surface of the reference bar. The other end of the sine bar also has a rolling contact which is adapted to be engaged by a plurality of gauged blocks which have been precisely machined so as to cause a referenced surface on the sine bar to extend at a precise angle from the support surface of the reference bar. Bolt means are provided to bolt the sine bar in place after the gauge blocks have been interposed between the bearing surface of the sine bar and the support surface of the reference bar.

The sine bar of the present invention can be used in conjunction with cylindrical grinders and other spindle/type machines, as well as lathes, without the necessity of changing its center over a wide range of angles. Other objects, features, and advantages of the invention will be understood in reference to the attached drawings and the detailed description of the invention hereinafter.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein:

FIG. 6 is a perspective view similar to FIG. 2, showing the set up for checking the parallel alignment between the sine bar of the present invention and the compound slide of the lathe.

DESCRIPTION OF A PREFERRED EMBODIMENT

Figure 1:
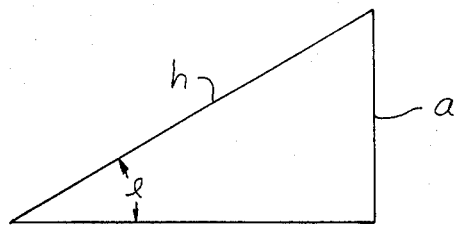
FIG. 1 is a diagram illustrating the principle of the operation of the sine bar.

Referring now to FIG. 1 of the drawings wherein the diagram illustrates the principle of operation of the sine bar. In this diagram, the dimension "a" is the vertical height of the gauge blocks used in the sine bar and the dimension "h" is the length of the hypotenuse. The well known formula for calculating the sine of $0=a/h$ is utilized in the sine bar of the invention to move the sine bar to a predetermined angle by use of predetermined gauge blocks.

Figure 2:
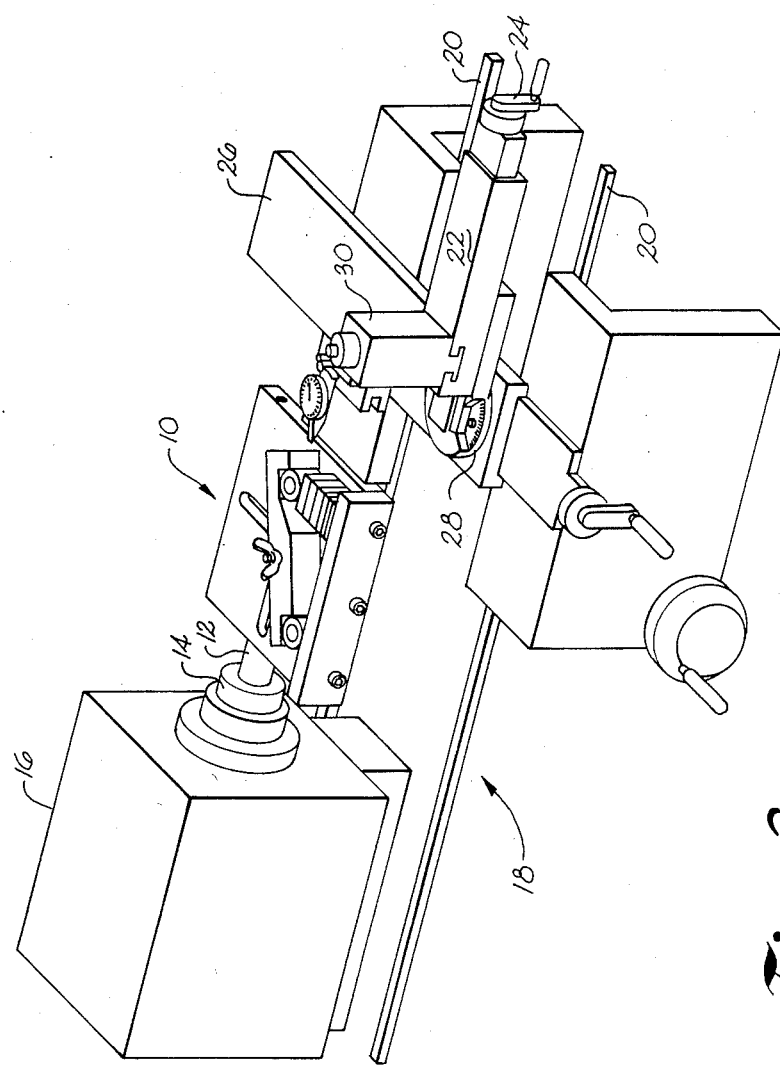
FIG. 2 is a perspective view of the sine bar of the present invention with the collet adapter mounted in the collet of a lathe and an indicator mounted in the tool holder, in the process of orienting the sine bar to a desired angle.
Figure 3:
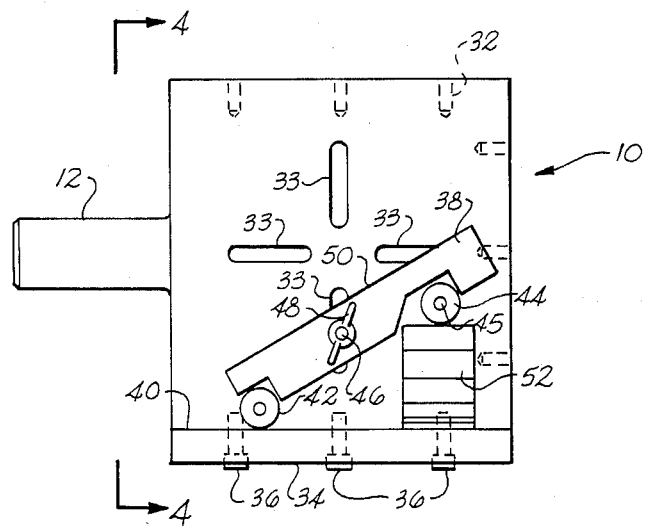
FIG. 3 is a plan view of the sine bar of the invention.

Referring now to FIGS. 2 and 3 of the drawings where the sine bar apparatus of the invention is illustrated sine bar apparatus comprises a collet adapter 12 for disposition within collet 14 of the headstock housing 16 for a lathe. The lathe has a carriage 18 and a machine bed 20 with a slide bar 22. A hand wheel 24 is provided for adjusting the slide bar 22.

A cross slide 26 is also adjusted by a suitable hand wheel. The lathe shown in FIGS. 2 and 6 is a conventional lathe and may be, for purposes of this illustration, of the general form of the Harrison M300 13 inch swing lathe, which is manufactured for REM SALES, INC., a subsidiary of the Robert E. Morris Company of West Hartford, Conn. 06107, and is described in their catalog 5M2-82. The identified lathe operates at from 40-2500 r.p.m., and has a 3 horse power T.E.F.C. motor drive, a 4 inch cam lock spindle, with a 1½ inch floor, and a universal gear box for inch or metric threads.

The motor and gearing mechanism is included in a head stock housing 16, projecting from one lateral wall of which, is a collet 14, into which is inserted the collet adapter 12 of the sine bar of the invention.

The sine bar of the invention comprises a base 32 which is rectangular which has a plurality of slots 33 extending either transversely of the longitudinal axis of collet adapter 12 or in substantial alignment, coextensive with the longitudinal axis of collet adapter 12. Slots 33 are located centrally of the base 32.

Affixed to either of the three sides of the base 32, other than the side from which collet adapter 12 protrudes, is a reference bar 34 which is held in place against one side of the base 32.

Figure 4:
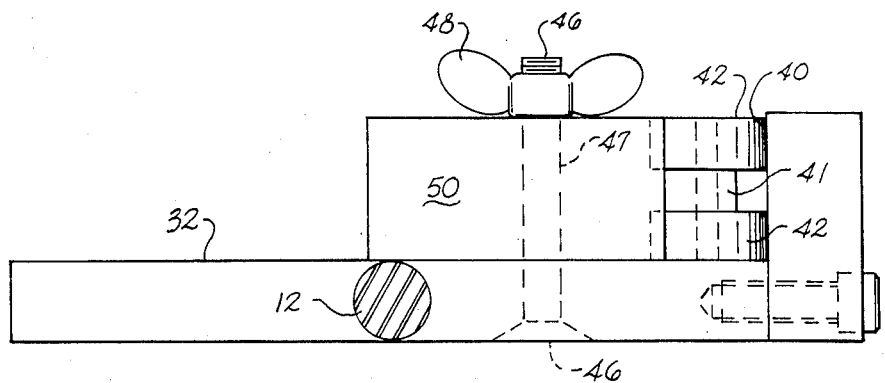
FIG. 4 is a view taken along lines 4—4 of FIG. 3, showing the engagement of the reference bar with the sine bar, on the upper surface of the base.

As seen more clearly in FIGS. 3 and 4, the reference bar 34 is held in place by a plurality of machine bolts or screws 36 and has a support surface which extends above the surface of the base 32 for supporting the sine bar itself.

Sine bar 38 is generally rectangular and has a centrally located opening 47 through which extends a locking bolt 46 for pivotally anchoring the sine bar to base 32. Bolt 46 extends through one of slots 33 so as to lock the sine bar onto the surface of the base plate 32 on the sine bar.

Sine bar 38 is also provided at one end with a lower support roller 42 mounted on a lower support roller axial 43 for rotation. Lower support roller 42 is a compound roller and axle 43 is supported by sine bar support arm 41 which extends from sine bar 38 as seen in FIG. 4 of the drawing. Sine bar support arm 41 has a length which is lightly less than the diameter of the support roller 42 which permits roller 42 to contact surface 40 with rolling contact.

On the other end of sine bar 38 is an upper support roller 44 which is also mounted in the manner shown for lower support roller 42 on an upper support roller axle 45. Sine bar 48 is provided with a reference surface 50 which is precisely machined to represent the hypotenuse of the angle formed between reference surface 50 and support surface 40 of reference bar 34.

A plurality of gauge blocks 52, which are precisely machined and are of the type manufactured by HDT International, Inc. of 15957 Minnesota Avenue, Paramount, Calif. 90723-4883 and are illustrated in their catalog, HDT 5-83. The surfaces of these blocks are flat and their heights are carefully calibrated to within 0.0002 inch in order to precisely measure the angle formed by reference surface 50 and support surface 40. The height of the gauge blocks constitutes the "h" in the formula illustrated in FIG. 1. After the gauge blocks are selected for the precise angle needed, lock bolt 46 is locked in place within slot 33 by means of a lock nut 48 which maintains the surface of upper support roller 44 in contact with the upper surface of gauge blocks 52 and the surface of lower support roller 42 in contact with surface 40 while the lathe is adjusted to the precise angle desired.

Figure 5:
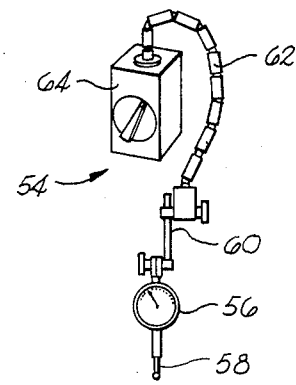
FIG. 5 shows the indicator assemblage, attached to a magnetic, flexible holder for use with the sine bar of the present invention.

FIG. 5 shows an indicator assemblage 54 which is utilized to determine whether a surface is flat, and to determine if two surfaces are parallel. This device may be, for example, of the type manufactured by Swiss Precision Instruments of Carlstadt, N.J., and illustrated on Page 98 of their 1984 catalog and sold under the trademark TESTAST. The device is used for measurements in accordance with the present invention and is equipped with a dial 56 which is 1 inch in diameter and has a pointer which moves to a series of graduations equal to 0.0005 inch, indicating a range of 0.03 inch. The indicator assemblage 54 is equipped with a ½ inch long contact point or probe 58, which is designed to move over the top surface and to communicate changes in surface elevation to the inner mechanism for recording on the dial 56. Rigidly connected to the housing of assemblage 54, diametrically opposite the probe 58, is a rigid connecting rod 60, which depending on the measurement being made, can be used to slant the assemblage 54 in a desired position on the lathe compound.

For example, for the initial positioning of the compound sine bar in the collet 14 of the lathe rod 60 is fastened to the tool post of tool holder 30 so that the contact point or probe 58 touches sine bar base 32. Indicator assemblage 54 also comprises a flexible neck 62 connecting the rod 60 to a magnetic base lock 64 as seen in FIGS. 5 and 6.

While a preferred embodiment of the invention has been described using specific terms, such description is for illustrative purposes only, and it is to be understood that changes and variations may be made without departing from the spirit or scope of the following claims.

What is claimed is:

1. A sine bar apparatus for the precise measurement of angles for machining operations, comprising:
   (a) a flat, rectangular base having an upper and a lower surface and four sides, a collet adapter extending from one side of said base at right angles thereto in a plane parallel to said upper surface, and at least one slot extending at a right angle to another side of said base;
   (b) a reference bar attached to said other side of said base, having a support surface which extends above said upper surface of said base;
   (c) an elongated generally rectangular sine bar having a reference surface extending along one side of said sine bar, pivotally connected to said upper surface of said base through said slot at a point intermediate the ends of said sine bar, and having one end of the other side of said sine bar in contact with said support surface of said reference bar; and
   (d) at least one gauge block disposed between the other end of said other side of said sine bar and said support surface for causing the reference surface of said sine bar to form a predetermined angle with the support surface of said reference bar, said reference surface lying in a plane which intersects the longitudinal axis of said collet adapter at a predetermined angle.

2. A sine bar apparatus as set forth in claim 1, wherein said reference bar is attached to a side of said base which is parallel to the longitudinal axis of the collet adapter.

3. A sine bar apparatus as set forth in claim 1, wherein said reference bar is attached to a side of said base which is transverse to the longitudinal axis of said collet adapter.

4. A sine bar apparatus as set forth in claim 1, wherein rolling means are interposed between said one end of said sine bar and said support surface.

5. A sine bar apparatus as set forth in claim 1, wherein each end of said sine bar has rolling means interposed between it and the support surface.

6. A sine bar apparatus as set forth in claim 5, wherein said sine bar has a roller interposed between said sine bar and said gauge block.

7. A sine bar apparatus as set forth in clam 1, wherein said sine bar is bolted to said flat, rectangular base.

8. Apparatus as set forth in claim 1, wherein a plurality of gauge blocks are interposed between one end of said sine bar and said support surface.

9. A sine bar apparatus for precise measurement of angles for machining operations comprising:
   (a) a flat, rectangular base having an upper and a lower surface and four sides, a collet adapter extending transversely from one side of said base in a plane parallel to said upper surface, and a plurality of slots extending transversely of the sides;
   (b) a reference bar attached to one side of said base other than the side from which said collet adapter extends and having a support surface which extends above the upper surface of said flat, rectangular base;
   (c) an elongated, generally rectangular sine bar having a reference surface extending along one side of said sine bar and being pivotally connected to said upper surface of said rectangular base through one of said transverse slots at a point intermediate the ends of said sine bar, and having one end of the other side of said sine bar in contact with said support surface of said reference bar; and
   (d) gauge means disposed between the other end of the other side of said sine bar and said support surface for causing the reference surface of the sine bar to form a predetermined angle with the longitudinal axis of said collet adapter.

10. A sine bar apparatus as set forth in claim 9, wherein said reference bar is attached to a side of said base which is parallel to the longitudinal axis of the collet adapter.

11. A sine bar apparatus as set forth in claim 9, wherein said reference bar is attached to a side of said base which is transverse to the longitudinal axis of said collet adapter.

12. A sine bar apparatus as set forth in claim 9, wherein rolling means are interposed between said one end of said sine bar and said support surface.

13. A sine bar apparatus as set forth in claim 12, wherein each end of said sine bar has rolling means interposed between it and the support surface.

14. A sine bar apparatus as set forth in claim 9, wherein said sine bar has a roller interposed between said sine bar and said gauge block.

15. A sine bar apparatus as set forth in claim 9, wherein said sine bar is bolted to said flat, rectangular base.

16. Apparatus as set forth in claim 9, wherein a plurality of gauge blocks are interposed between one end of said sine bar and said support surface.

* * * * *